United States Patent
Soltani et al.

(10) Patent No.: US 12,015,692 B2
(45) Date of Patent: *Jun. 18, 2024

(54) ENHANCED ENCRYPTION FOR FACE-RELATED DATA

(71) Applicant: Verkada Inc., San Mateo, CA (US)

(72) Inventors: Kiumars Soltani, Redwood City, CA (US); Yuewei Wang, Mountain View, CA (US); Kabir Chhabra, Sunnyvale, CA (US); Jose M. Giron Nanne, San Francisco, CA (US); Yunchao Gong, Los Altos, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,026

(22) Filed: Sep. 30, 2022

(65) Prior Publication Data

US 2023/0327848 A1    Oct. 12, 2023

Related U.S. Application Data

(63) Continuation of application No. 17/716,424, filed on Apr. 8, 2022, now Pat. No. 11,496,288.

(51) Int. Cl.
*H04L 9/00*        (2022.01)
*G06F 21/60*       (2013.01)

(52) U.S. Cl.
CPC ............ *H04L 9/008* (2013.01); *G06F 21/602* (2013.01)

(58) Field of Classification Search
CPC ...... H04L 9/008; H04L 9/3231; G06F 21/602
See application file for complete search history.

(56) References Cited

U.S. PATENT DOCUMENTS 8,972,742 B2 * 3/2015 Troncoso Pastoriza ..................... H04L 63/0861
713/186
10,897,351 B1 * 1/2021 Kirchhof ............. H04L 63/0428
(Continued)

FOREIGN PATENT DOCUMENTS

CN      112200133 A      1/2021
WO   WO-2012114452 A1 *   8/2012 ............ H04L 9/008

OTHER PUBLICATIONS

International Search Report and Written Opinion for WO Patent Application No. PCT/US23/65517 dated Jul. 21, 2023, 12 pages.

*Primary Examiner* — Meng Li
(74) *Attorney, Agent, or Firm* — Perkins Coie LLP; Michael A. Glenn

(57) ABSTRACT

A method includes obtaining a plurality of representative vectors associated with face-related data. The method includes determining an encryption key based on a parameter stored in a record, generating an encrypted vector set by, for each respective vector of the plurality of representative vectors, encrypting the respective vector with a homomorphic encryption operation based on the encryption key, where the encrypted vector set includes a first encrypted vector that is linked to a subset of the face-related data associated with the first plurality of face vectors. The method further includes obtaining an encrypted face search vector using the encryption key to perform homomorphic encryption. The method further includes selecting a first encrypted vector based on the encrypted face search vector and retrieving the subset of the face-related data based on the first encrypted vector.

20 Claims, 5 Drawing Sheets

(56) References Cited

U.S. PATENT DOCUMENTS

| | | | |
|---|---|---|---|
| 11,080,316 B1 | 8/2021 | Das et al. | |
| 11,347,868 B2* | 5/2022 | Araya | H04L 9/0841 |
| 11,354,936 B1* | 6/2022 | Chandarana | G06V 40/172 |
| 11,461,551 B1* | 10/2022 | Thaine | G06F 16/3347 |
| 11,496,288 B1* | 11/2022 | Soltani | G06F 21/602 |
| 11,514,714 B1* | 11/2022 | Soltani | G06V 10/77 |
| 2008/0105742 A1* | 5/2008 | Kim | G07C 13/00 235/386 |
| 2011/0026781 A1* | 2/2011 | Osadchy | G06V 40/16 382/118 |
| 2011/0066783 A1* | 3/2011 | Konireddygari | G06F 21/71 719/321 |
| 2017/0193286 A1* | 7/2017 | Zhou | G06V 40/172 |
| 2017/0310486 A1* | 10/2017 | Goldfarb | H04L 63/0428 |
| 2019/0140818 A1* | 5/2019 | Bent | H04L 9/3093 |
| 2020/0065563 A1 | 2/2020 | Zou et al. | |
| 2021/0073407 A1* | 3/2021 | Yu | H04L 9/0618 |
| 2021/0256058 A1* | 8/2021 | Browarnik | G06V 10/7715 |
| 2021/0313026 A1* | 10/2021 | Wagner | A61B 5/1176 |
| 2021/0390315 A1* | 12/2021 | Behrostaghi | G06V 40/172 |
| 2022/0006629 A1* | 1/2022 | Williams | G06F 21/6245 |
| 2022/0103362 A1* | 3/2022 | Chafni | G06V 40/166 |
| 2022/0138455 A1* | 5/2022 | Nagano | G06T 5/006 382/118 |
| 2022/0164380 A1 | 5/2022 | Lin et al. | |
| 2022/0182239 A1* | 6/2022 | Hassanzadeh | H04L 9/0866 |
| 2022/0308756 A1* | 9/2022 | Raval | G06F 3/061 |
| 2023/0082834 A1* | 3/2023 | Verbeke | G06V 40/168 382/155 |
| 2023/0327848 A1* | 10/2023 | Soltani | H04L 9/3231 380/28 |

* cited by examiner

ENHANCED ENCRYPTION FOR FACE-RELATED DATA

CROSS-REFERENCE TO RELATED APPLICATIONS

This application is a continuation of U.S. Patent Application Ser. No. 17/716,424, filed Apr. 8, 2022, which is incorporated by reference herein in its entirety.

BACKGROUND

Facial recognition technology serves a vital role in various industries such as security, gaming, or healthcare. In many cases, cameras or other sensors may capture image data in the form of still images, video data, or biometric data related to faces. Facial recognition technology may then use this data to determine the position of a person, the movement or actions of the person through a physical space, and the places where the person enter or exit the physical space.

SUMMARY

In many cases, the effectiveness of applications of facial recognition technology may be directly correlated with the speed and accuracy. However, the volume of facial data collected by cameras may prove a hindrance to the fast or accurate determination of facial data. Furthermore, different organizations may have different use cases, needs, and security requirements for their face-related data. These differences may complicate data retrieval requirements and efforts to secure the privacy of individuals. Furthermore, data security concerns between organizations may create significant issues in shared-data environments. An organization may have a significant interest in restricting other organizations from seeing or searching through their face-related data.

Some embodiments described in this disclosure may provide solutions to the issues described above and other issues by compacting face-related data. Some embodiments may obtain face-related data from a set of sensors and store the face-related data as pluralities of face vectors. Some embodiments may generate a set of representative values for a collection of representative values based on the face data, where some embodiments may match candidate face vectors to vectors of the collection of representative values. A search for a particular face may be converted into a set of search parameters and used to search through the collection of representative values to retrieve face-related data. For example, some embodiments may generate representative vectors based on a plurality of face vectors, where the face vectors may be in a latent space that will group face vectors of the same face. Some embodiments may generate multiple sets of representative values corresponding with different pluralities of face vectors. For example, after grouping multiple face vectors into segments of face vectors, some embodiments may generate a different representative vector for each segment of face vectors.

Some embodiments may determine whether separate pluralities of face vectors are sufficiently similar and combine the plurality of face vectors. For example, some embodiments may determine whether a latent space distance between the face vectors of a first segment and the face vectors of the second segment are sufficiently similar. Based on a determination that the segments are sufficiently similar, some embodiments may combine the segments of face vectors or other face-related data. Combining the segments of face vectors may include generating a new set of representative values for the collection of representative values or using an existing set of representative values to associate with both segments of face vectors. In addition, some embodiments may remove a previous set of representative values from the collection of representative values. For example, after generating a new combined representative vector associated with a first and second plurality of face vectors, some embodiments may remove the individual representative vectors previously associated with the first and second pluralities of face vectors from the collection of representative values.

Some embodiments may obtain a plurality of representative vectors associated with face-related data, where each respective representative vector is associated with a respective plurality of face vectors within a respective region of a latent space shared by the respective plurality of face vectors. Some embodiments may then obtain a plurality of representative vectors associated with face-related data, where each respective representative vector is associated with a respective plurality of face vectors within a respective region of a latent space shared by the respective plurality of face vectors. Some embodiments may then determine an encryption key based on a parameter stored in a record. Some embodiments may then generate an encrypted vector set by, for each respective vector of the plurality of representative vectors, encrypting the respective vector with a homomorphic encryption operation based on the encryption key. In some embodiments, the encrypted vector set includes a first encrypted vector that is linked to a subset of the face-related data associated with the first plurality of face vectors. Some embodiments may obtain an encrypted face search vector, wherein the encrypted face search vector is generated by encrypting a face search vector of a face with the homomorphic encryption operation using the encryption key. Some embodiments may then select a first encrypted vector based on the encrypted face search vector and retrieve the subset of the face-related data based on the first encrypted vector.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
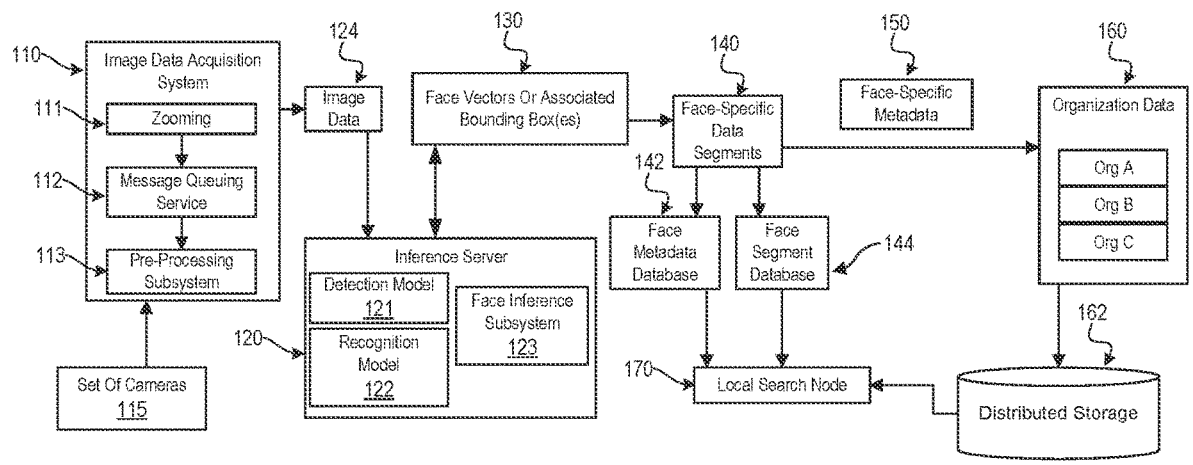
FIG. 1 shows an illustrative architecture for obtaining and processing face-related data, in accordance with one or more embodiments.

FIG. 1 shows an illustrative architecture for obtaining and processing face-related data, in accordance with one or more embodiments. An image data acquisition system 110 may be connected to a set of cameras 115. The set of cameras 115 may obtain image data that is provided to the image data acquisition system 110, where the image data may include video streams, still images, or other image data. The image data acquisition system 110 may perform zooming operations using a zooming subsystem 111, where one or more operations may include detecting facial features based on the zoomed data. Some embodiments may then use a message queuing service 112 to send messages, where the message queuing service 112 may use one or more commercial queuing services, such as Amazon SQS™, Apache Kafka™, etc. The messages may represent the zoomed data or other image-related data and may be sent to a video pre-processing subsystem 113. Some embodiments may use the video pre-processing subsystem 113 to perform various pre-processing operations to output the image data 124. For example, some embodiments may use the video pre-processing subsystem 113 to perform operations such as pre-segmenting data, assigning time stamps, generating still images used to determine face vectors, etc.

As described elsewhere in this disclosure, the image data acquisition system 110 may output image data 124. The image data 124 may include a set of images for image recognition operations and an initial set of metadata associated with the image data 124. Some embodiments may provide the image data 124 to an inference server 120, where the inference server 120 may include a detection model 121, a recognition model 122, and a face inference subsystem 123. Some embodiments may use the detection model 121 to detect a set of faces, face-related objects, or other objects in an image or video of the image data 124. For example, some embodiments may use the detection model 121 to detect a set of faces, bodies, torsos, clothing, shoes, etc. Furthermore, some embodiments may use the detection model 121 to determine bounding boxes outlining a detected object or otherwise associated with the detected object, where a bounding box may be shaped as a rectangle, ovaloid, or another shape. Alternatively, or in addition, a bounding box may be an amorphous shape that encompasses the edges of a shape.

Some embodiments may use the recognition model 122 to generate sets of face vectors. For example, some embodiments may use the recognition model 122 to quantify features of a sub-image within bounding boxes detected by the detection model 121. Some embodiments may then use the recognition model 122 to generate face vectors in a latent space based on the features. For example, the recognition model 122 may include a neural network model, and some embodiments may generate a face vector based on the features using the neural network model.

Some embodiments may use the recognition model 122 to recognize a face between different images and track the face across the different images. For example, some embodiments may use the recognition model 122 to generate face vectors for a set of images and track a face across a set of images based on the similarities between the face vectors. Alternatively, or in addition, some embodiments may track an individual through a camera image or set of camera images based on a set of features that include both face-related data and body-related data. For example, some embodiments may determine that a face vector is associated with a body, where the recognition model 122 may perform operations to quantify features such as height, clothing color, clothing type, etc. Some embodiments may then associate the face vector with the body and associate multiple sets of face vectors obtained at different times of a recording or from different cameras based on their shared association with an individual. For example, some embodiments may obtain a first set of face vectors from a first video segment obtained from a first camera for a first time range and then obtain a second set of face vectors from a second video segment obtained from a second camera for a second time range. Some embodiments may then determine that images of the first video segment and images of the second video segment are associated with each other based on a determination the first and second sets of face vectors are associated with a shared individual and may further associate the first and second sets of face vectors with a combined set of representative values using operations described in this disclosure.

Some embodiments may use a face inference subsystem 123 to determine one or more facial features to associate with a recognized face. For example, some embodiments may use the face inference subsystem 123 to determine a known identity based on the face, such as a user identifier from a database of a set of user records. In many cases, the face inference subsystem 123 or the recognition model 122 may be used to match a candidate face vector obtained from an image of the image data 124 with a face vector from a face-related database, where records of the face-related database may be associated with user identifiers associated with a library of face vectors, non-registered person identifiers associated with the library of face vectors, or other identifiers. For example, some embodiments may determine that a detected individual has a face vector that matches with a face vector of a record associated with a previous visitor of a geographic location. In addition, some embodiments may use the face inference subsystem 123 to determine possible actions or statuses based on a set of detected face vectors. For example, some embodiments may use the face inference subsystem 123 to determine an emotional state for a face based on the face vector representing the face.

Some embodiments may use the inference server 120 to provide a set of face vectors and associated bounding boxes 130. The set of face vectors or associated bounding boxes 130 may be used in real-time to recognize faces, detect the presence of individuals, track group activities, etc. For example, some embodiments may output a sequence of face vectors in a latent space using a neural network based on facial feature data obtained from sub-images within bounding boxes. Alternatively, or in addition, some embodiments may generate one or more face vectors of the set of face vectors and associated bounding boxes based on historical data that was previously collected. For example, some embodiments may perform analysis operations on video data collected more than one day before performing the analysis operations to generate the set of face vectors or associated bounding boxes 130. In some embodiments, the set of face vectors or associated bounding boxes 130 may be associated with other face-related data, such as a measurement of symmetry, dimensions of a face or portions of the face, etc. For example, a set of vector values may represent a portion of a human face. Some embodiments may generate the set of face vectors and associated bounding boxes 130 in real-time. Furthermore, in some embodiments, images or other face-related data described in this disclosure may be obtained from a continuous segment of video data.

Some embodiments may generate face-specific data segments 140, where each segment of the face-specific data segments 140 may include or otherwise be associated with a video segment. A face-specific data segment of the face-specific data segments 140 may also represent, include, or be otherwise associated with a collection of face vectors, where each face vector is associated with the same face. Some embodiments may determine face-specific data segments based on time, location, facial identity, etc. For example, some embodiments may generate face vectors for multiple faces detected in a video stream for a first 15-minute period in a set of recurring 15-minute periods, where a first set of face vectors may be similar to each other and be obtained from a first detected face in the 15-minute video stream, and where a second set of face vectors may be similar to each other and be obtained from a second detected face in the 15-minute video stream. Some embodiments may then generate a first face-specific data segment that includes or is associated with the 15-minute video stream, where the first face-specific data segment includes the first set of face vectors, and where the second face-specific data segment includes the second set of face vectors. In some embodiments, the first and second face-specific data segment may be associated with the same 15-minute video stream but include separate bounding boxes to indicate sub-images in the video stream that show the faces used to generate the first or second face-specific data segments, respectively.

Some embodiments may determine a centroid in a latent space based on a segment of the face-specific data segments 140 and then generate a representative vector based on the centroid, where the representative vector may be the centroid or otherwise include the centroid. Alternatively, some embodiments may reduce the dimensionality of the centroid to determine the representative vector. For example, some embodiments may use principal component analysis to determine a set of principal components. Some embodiments may then reduce the centroid to a set of representative values based on the principal components. Some embodiments may use alternative methods of reducing the dimensionality of a centroid to determine a representative vector. For example, some embodiments may use an autoencoder neural network model or other types of neural network model to determine a set of representative values based on centroid or another vector in a latent space. After determining the set of representative values based on a segment of the face-specific data segments 140, some embodiments may associate the set of representative values with the segment such that data stored in or otherwise associated with the segment may be retrieved with the set of representative values. In some embodiments, a collection of representative values may be configured to include sets of representative values usable to retrieve face-related data. For example, the collection of representative values may be configured to include representative vectors for each face-specific data segment of the face-specific data segments 140.

Some embodiments may store some or all of the data of the face-specific data segments 140 into a face-specific data segment database 144, where the set of representative values generated for the face-specific data segments 140 may be used to retrieve the face-specific data segments in the face-specific data segment database 144. For example, after generating a first representative vector for a first segment and a second representative vector for a second segment, some embodiments may store the first and second segments in the face-specific data segment database 144 and then associate the first and second segments by their corresponding first and second representative vectors. Furthermore, some embodiments may store the representative vectors or another set of representative values in a separate database that is different from face-related data.

Furthermore, some embodiments may store face-specific metadata in the face-specific metadata database 142. Face-specific metadata may include vector-related information, such as distances in a latent space between a centroid of a cluster of face vectors and individual face vectors of the cluster of face vectors, dimensions in the latent space characterizing the cluster of face vectors, cameras, or geographic locations or other physical locations associated with an image used to generate a face vector, etc. In some embodiments, the face-specific metadata may also include other information related to a face identified by face vectors or other data of face-specific data segment. For example, the face-specific metadata may include a known identifier associated with a face, entry or exit times for a physical space, an occupant category associated with the face, a history of previous geographic locations indicated as having been visited by an individual associated with the face, etc.

Some embodiments may store the face-specific data segments 140 in organization-specific databases 160. In addition, some embodiments may store face-specific metadata 150 associated with any segments of the face-specific data segments 140 sent to the organization-specific databases 160. For example, the face-specific metadata 150 may include information such as an organization identifier for an organization that should have access to a face-specific data segment, a time range representing the time during which the face-specific data segment was measured, a filename that may include a start or end offset for the video segment of the face-specific data segment, etc. In some embodiments, the face-specific metadata 150 may be obtained from the face-specific metadata database 142.

Some embodiments may store face vectors in the organization-specific databases 160 after transforming the face vectors using organization-specific encryption. For example, some embodiments may use a homomorphic encryption method and a first encryption key to encrypt a first set of face vectors linked to a first set of face-related data (e.g., a first set of face images) to generate an encrypted first set of face vectors in a first encrypted latent space. Furthermore, some embodiments may use the homomorphic encryption method and a second encryption key to encrypt a second set of face vectors linked to a second set face-related data (e.g., a second set of face images) to generate an encrypted second set of face vectors in a second encrypted latent space. The first and second encrypted latent spaces may be different from each other. For example, the first and second encrypted latent spaces may vary with respect to dimension, range, shape, etc. Some embodiments may be unable to use an encrypted face search vector transformed using the first encryption key to accurately search through the second encrypted latent space due to possible differences in ranges or dimensionality of their encrypted latent space. Similarly, some embodiments may be unable to accurately use an encrypted face search vector transformed using the second encryption key to search through the first encrypted latent space. However, the encrypted face vectors may still be linked to or otherwise associated with face-related data, such as face-related data stored in distributed storage 162.

Some embodiments may store face-specific data segments 140, data from the face-specific data segment database 144, data from the face-specific metadata database 142, or data from organization-specific databases 160 in a distributed storage 162. As described elsewhere in this disclosure, the distributed storage 162 may store data on multiple servers that may be distributed across a wide geographic area and provided to multiple local nodes, such as multiple local search nodes. Furthermore, some embodiments may provide data from the distributed storage 162 data from the face-specific data segment database 144, data from the face-specific metadata database 142, or other face-related data from the face-specific data segments 140 to a local search node 170. As described elsewhere in this disclosure, some embodiments may permit a user to search for a face using the local search node 170 and the data provided to the local search node 170 to retrieve image data, such as still image data or video data associated with the face.

Figure 2:
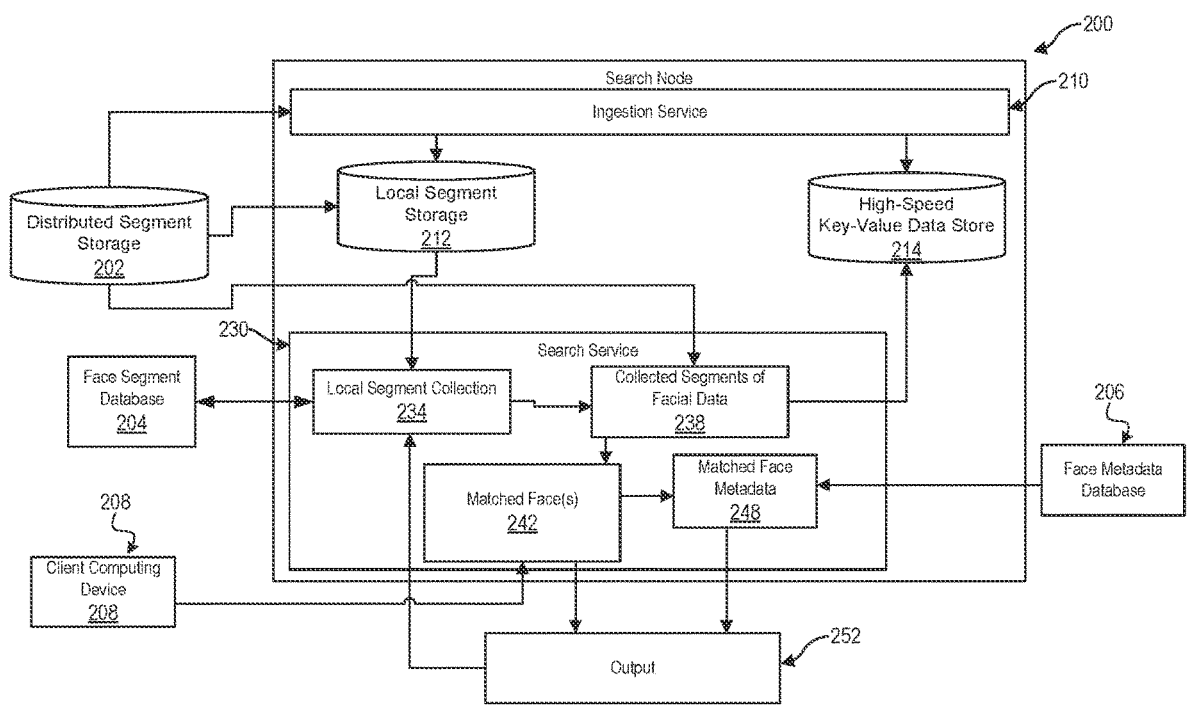
FIG. 2 shows an illustrative architecture of a search node to retrieve face-related data in response to facial data, in accordance with one or more embodiments.

FIG. 2 shows an illustrative architecture of a search node to retrieve face-related data in response to facial data, in accordance with one or more embodiments. Some embodiments may use a search node 200 to retrieve data related to a face. The search node 200 may be hosted on a computing device such as a server or set of servers. For example, some embodiments may implement the search node 200 using cloud web services, such as Amazon AWS™, Microsoft as your™, Google cloud™, etc. In some embodiments, the search node 200 may be hosted via virtualization of the search node 200. For example, the search node 200 may be implemented as a set of services being executed via one or more orchestrated containers or via one or more virtual machines.

The search node 200 may include an ingestion service 210, where the ingestion service 210 may perform operations such as obtaining new face-segments of video data, storing the segments in a local file system, or updating a local database of face-specific data segments. For example, the ingestion service 210 may obtain new segments from the face-specific data segment database 144 or a distributed segment storage 202, where the distributed segment storage 202 may include the distributed storage 162. Some embodiments may cache segment data in a local segment storage 212, where the local segment storage may be used to store organization-specific video data. Some embodiments may be triggered to cache data in a local data store after determining that the events of a video segment occurred after a pre-determined time range. For example, some embodiments may determine that the events of a video segment occurred after a pre-determined time range of one week from a current time and, in response, cache the video in a local data store. Furthermore, the ingestion service 210 may be used to cache face-specific data segments, face-specific data segment metadata, or other data in a high-speed key-value data store 214. The high-speed key-value data store 214 may be implemented as a Redis data platform, a RocksDB key-value store, a Memcached key-value store, etc.

Some embodiments may update segments stored in the local segment storage 212 or the high-speed key-value data store 214 by compacting one or more segments together. Some embodiments may compact multiple segments to form a combined segment. For example, some embodiments may retrieve the face vectors of a first segment corresponding with a time range between T=0 and T=15 minutes and the face vectors of a second segment corresponding with a time range between T=15 minutes and T=30 minutes. Some embodiments may then determine whether a similarity score between the face vectors of the first segment is sufficiently similar to the face vectors of the second segment. For example, some embodiments may determine a first representative vector representing a reduced-dimension form of the face vectors of the first segment and a second representative vector representing a reduced-dimension form of the face vectors of the second segment. Based on a determination that the first and second segments are within a threshold distance of each other within a latent space, some embodiments may then combine the first and second segments into a single combined segment in the local segment storage 212. In some embodiments, the single combined segment may be retrievable with the first representative vector, second representative vector, or a generated combined representative vector different from the first or second representative vectors in the local segment storage 212. Alternatively, or in addition, some embodiments may update the high-speed key-value data store 214 the single combined segment may be retrievable with the first representative vector, second representative vector, or a generated combined representative vector different from the first or second representative vectors in the high-speed key-value data store 214.

In comparison to previous video data ingestion operations, a compaction operation described in this disclosure permits the high-velocity ingestion of searchable video data. For example, after ingesting segments of video data in real-time, some embodiments may perform compaction operations in a background process described in this disclosure to re-index the historical data for querying. Thus, the search space for a query may grow at a significantly reduced rate in comparison to the ingested video data. As used in this disclosure, a first and second event may be described to occur in real-time with respect to each other if the first and second event occur within five seconds of each other. For example, ingesting a first video segment may occur in real-time with respect to generating a face vector for the video segment if the face vector is generated within five seconds of the video segment ingestion.

As described elsewhere in this disclosure, data ingestion operations may be performed independently of data re-indexing operations. For example, the compaction operations may be performed by a background process that is independent of the data ingestion operations. In many cases, the background process may occur with less frequency than a rate at which the data ingestion operations occur. For example, an embodiment may perform data ingestion operations (e.g., operations to store video data or generate face vectors) in real-time with respect to events being recorded by a camera, whereas the embodiment may perform compaction or other re-indexing operations at a periodic frequency of once every 30 minutes, once very one hour, once over four hours, or some other recurring duration. The independence between data ingestion and re-indexing operations permits a high data ingestion rate because data ingestion is not reliant on the completion of re-indexing operations.

The search node 200 may obtain a search request from a client computing device 208 and retrieve face-related data based on the search request. For example, the search node 200 may obtain a request from a user of an organization, where the request may include or be otherwise associated with user or organization identifiers associated with a library of face vectors. In addition, the search request may include a set of search parameters that may be used to generate a set of search values Q. As described elsewhere in this disclosure, the set of search values Q may include a single search value, a plurality of values in the form of a vector, or some other type of one or more search values. Some embodiments may generate the set of search values Q by converting a face or set of face-related attributes into a set of values usable to retrieve face-related data from a set of data sources. For example, some embodiments may generate a search vector Q and use the search vector Q to retrieve face-related data from the local segment storage 212, the high-speed key-value data store 214, the face-specific data segment database 204, the distributed segment storage 202, or the face-specific metadata database 206.

The search service 230 may obtain the search request from the client computing device 208 and identify a set of segments based on one or more search parameters of the search request. For example, the search request may include an organization identifier "org-ID" and a time range represented by two numbers in an array. Some embodiments may retrieve a set of time segments associated with the organization identifier "org-ID" captured within the time range represented by the two numbers in the array. Some embodiments may first collect segments stored in a face-specific data segment database 204 or a local segment storage 212 and store the collected segments in a local segment collection 234. Some embodiments may determine that one or more segments are missing and collect additional segment data from the distributed segment storage 202. For example, some embodiments may determine that a search request indicates a time range greater than a threshold storage period for data stored in the local segment storage 212 or the face-specific data segment database 204. The threshold storage period may include a period greater than one hour, four hours, six hours, 12 hours, one day, greater than three days, greater than seven days, greater than 28 days, etc. In response, some embodiments may search the distributed segment storage 202 to obtain additional face-related data or other data to satisfy the time range of the search request. Some embodiments may then combine the data from the local segment collection 234 with the data from the distributed segment storage into a set of collected segments 238. Some embodiments may further update the high-speed key-value data store 214 with associated image data, face-related data, identity-related data, or other data for fast data retrieval.

Some embodiments may then use the search service 230 determine a set of matched faces 242 based on the search parameters of a search request and data from the set of collected segments 238. For example, some embodiments may transform a set of search parameters of a search into a search vector Q that is a vector within a latent space of the face vectors. Some embodiments may then determine latent space distances between the search vector Q and a set of representative vectors, where any latent space distance that satisfies a maximum latent space similarity threshold may be indicated as a match. For example, based on a determination that a normalized distance between a search vector Q and a first representative vector for a first segment is equal to 0.02 and that this normalized distance is less than a pre-determined latent space similarity threshold of 0.03, some embodiments may determine that face vectors of the first segment are matches with the search vector Q.

Some embodiments may retrieve face-specific metadata from the face-specific metadata database 206 for faces associated with the set of matched faces 242. For example, some embodiments may retrieve an identifier based on a determination that the a matched face of the set of matched faces 242 maps to the identifier, where the identifier may be a formal identifier of a known user, a previously-recognized person that was assigned with a temporary identifier, etc. Alternatively, or in addition, the metadata may include other attributes such as time-related data (e.g., the times of entry or exit from a physical location, the amount of time spent at a physical location, etc.), organization-related data (e.g., identifiers of an organization permitted to view the face-related data, categories associated with an organization, identifiers of an organization associated with a geographic location, etc.), captured activity associated with the person having the matched face, etc. Furthermore, some embodiments may perform searches in multiple stages. For example, some embodiments may filter a collection of face vectors or other representative values of a face to determine a subset of representative values based on a first set of query values of a query, where the first set of query values may include a time-related value or an organization-related value. Some embodiments may then search the subset of representative values to retrieve one or more face-related vectors that matches a face-related vector of the query. In some embodiments, the retrieved vectors may include a combined set of representative values associated with a combined segment generated from a compaction operation.

In some embodiments, determining the set of search values may include determining a search vector Q based on an encryption key to generate an encrypted search vector. The encryption key may be based on an organization-specific parameter, a locality-specific parameter, or another type of parameter. Determining the encrypted search vector Q' may include generating a search vector that may be used to explore an encrypted latent space generated using the same set of encryption keys. For example, some embodiments may generate an encrypted face search vector based on an organization-specific parameter to search for vectors in an organization-specific latent space. In some embodiments, vectors in the organization-specific latent space may have been transformed such that a non-transformed search vector is not viable for retrieving data from the organization-specific latent space. For example, some embodiments may first generate a set of face vectors based on a search request from the client computing device 208. Some embodiments may then use a homomorphic transformation based on an organization key associated with the user that provided the request to determine an encrypted face vector. Various types of homomorphic transformations may be used, such as first-generation fully homomorphic encryption (FHE) schemes, second-generation FHA schemes, third-generation FHA schemes, or fourth-generation FHA schemes. For example, some embodiments may first encrypt face vectors of segments using a CKKS scheme and then store the encrypted face vectors in the local segment storage 212, the face-specific data segment database 204, or the high-speed key-value data store 214.

After encrypting face vectors using an encryption key based on an organization-specific parameter or another type of parameter, some embodiments may perform similar encryption on a face search vector obtained from a search request to generate an encrypted search vector Q'. Some embodiments may then perform operations to store the encrypted segments into the local segment collection 234 or the set of collected segments 238 after receiving the search request. Some embodiments may then perform a matching operation to determine encrypted latent space distances between the encrypted search vector Q' and a set of encrypted representative vectors representing the encrypted segments. Some embodiments may determine whether the encrypted latent space distance between Q' and a first encrypted representative vector satisfies a similarity threshold or some other set of similarity criteria (e.g., the first encrypted representative vector being the nearest neighbor of the encrypted search vector Q'). Based on a determination that the encrypted latent space distance satisfies a set of similarity criteria, some embodiments may then obtain face-related data linked to the first encrypted representative vector or otherwise associated with the first encrypted representative vector.

Once the set of matched faces 242 and associated set of matched face-specific metadata 248 have been retrieved, some embodiments may generate the output 252. The output may include time points in a video stream during which the matched face is detected, a video file, a set of search parameters, or the like. For example, some embodiments may provide an output that includes a representative sample of a matched face and video data in which the matched face has been found in a time range provided by a search request associated with an organization identifier. Some embodiments may perform body tracking operations to track an individual based on their face and body such that the motion of the individual may be tracked even when the face is not visible.

Figure 3:
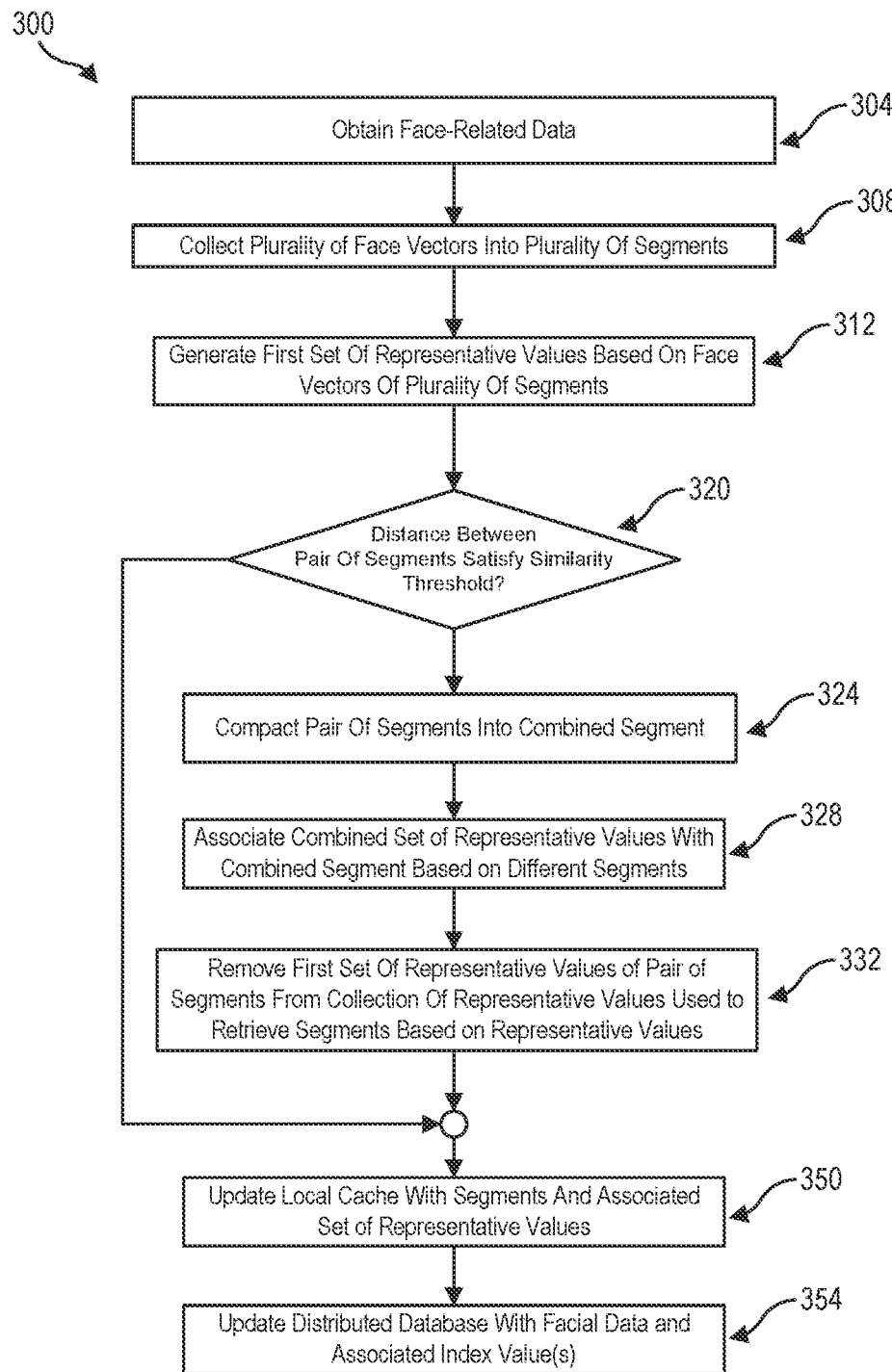
FIG. 3 shows a flowchart of a process to determine, compact, and retrieve face-related data, in accordance with one or more embodiments.

FIG. 3 shows a flowchart of a process to determine, compact, and retrieve face-related data, in accordance with one or more embodiments. Some embodiments may obtain face-related data as disclosed by block 304. Obtaining face-related data may include obtaining image data that captures one or more faces from a set of cameras, a set of mobile computing devices, a set of special sensors, a set of scanned images, some combination thereof, etc. Alternatively, or in addition, obtaining face-related data may include obtaining stored image data from a database or another type of data store. For example, some embodiments may obtain real-time video data from a set of cameras capturing image data and streaming the image data as a video stream, compressed using an H.265 video compression standard. As described elsewhere in this disclosure, some embodiments may perform operations to decompress a video stream before performing image recognition operations. Furthermore, some embodiments may reconstruct images for a selected subset of the video stream for face recognition operations and perform additional face recognition operations only upon recognizing a face in the image.

Some embodiments may perform preprocessing object recognition operations to isolate sections of the face-related data to identify a set of screen regions as including a face. For example, some embodiments may obtain an image from a video and determine different bounding boxes for the image. Each bounding box may indicate the location of a face in the image. Alternatively, or in addition, bounding boxes may indicate other features of a person, such as an arm, a torso, legs, or articles of clothing. Some embodiments may accelerate the speed of face recognition by limiting additional face recognition operations or face matching operations to sub-images within bounding boxes categorized as being boundaries for faces, where each bounding box may surround a face.

As described elsewhere in this disclosure, operations to obtaining face-related data or other data ingestion operations may be performed independently of data re-indexing operations, such as operations to compact segments of data into a combined segment. The independence of data ingestion and compaction permits a significantly greater write-intensive workload with respect to the video or other face-related data being written. Furthermore, some embodiments may make the written data immediately available for querying, where querying speed may then be increased by a periodic or otherwise automated set of compaction operations.

Some embodiments may collect a plurality of face vectors into a plurality of segments, as indicated by block 308. After collecting face-related data, some embodiments may determine a set of face vectors to represent faces captured by the video data. Various operations may be used to generate a face vector based on an image of a face. For example, some embodiments may extract a set of features from a face image, where a feature may include a set of pixel brightness values, a set of pixel color values, etc. Some embodiments may perform advanced recognition operations when determining a set of features for a face. For example, some embodiments may generate feature values for facial features such as dimensions of noses, eyes, cheeks, length to width ratios, ear size, ear shape, feature color, or other physical features of a face. Some embodiments may generate a vector using principal component analysis, a neural network, etc. For example, some embodiments may use a convolutional neural network model comprising an encoding set of neural network layers and a decoding set of neural network layers, where the encoding set of neural network layers may be trained to generate a face vector based on an input to face image. Upon being used as inputs to the decoding set of neural network layers, the face vector may cause the decoding set of neural network layers to output an approximation of the same face image. Some embodiments may then use the encoding neural network layers to generate face vectors in a latent space, where the face vectors for a shared face may be close to each other in the latent space.

Some embodiments may determine a face-specific data segment that includes a segment of video data and the face vectors of face images obtained from the segment of video data. In some embodiments, the face-specific data segment may also include face-related metadata, such as an identity associated with the face, an organization associated with the face, the amount of time that the face was detected in the segment, etc. Additionally, some embodiments may associate face-specific data segments with other face-specific data segments based on shared identifiers, such as a shared user identifier, shared organization identifier, etc.

Some embodiments may generate a set of representative values based on the face vectors of the plurality of segments, as indicated by block 312. Some embodiments may generate a set of representative values that includes a representative vector for each segment of the plurality of segments. For example, some embodiments may determine a centroid of a first plurality of face vectors of a first face-specific data segment. Some embodiments may then set the centroid as a representative vector for the segment, where the representative vector may be part of a collection of representative values. As described elsewhere in this disclosure, some embodiments may retrieve a face vector by performing a nearest neighbor search between a candidate vector and vectors of the collection of representative values.

Some embodiments may determine whether the candidate vector is within a radius of the cluster, where the radius may include a maximum radius representing the distance of a furthest vector of the cluster from the centroid of the cluster. Alternatively, the radius may include an mean or median distance of the vectors of the cluster from the centroid of the cluster. Some embodiments may determine whether a candidate vector is within the radius of a centroid of a cluster for a face-specific data segment. If the candidate vector is within the radius of the centroid, some embodiments may permit the selection of the representative vector and associated segment to indicate that the associated face-specific data segment includes face vectors that match the candidate vector. Furthermore, some embodiments may perform a dimension-reducing operation based on the vectors of a data segment. For example, some embodiments may generate a 3-dimensional representative vector for a segment from a set of 20-dimensional face vectors using a neural network.

Some embodiments may determine whether a distance between two different segments satisfies a similarity threshold, as indicated by block 320. Some embodiments may determine that a distance between two different segments satisfies the similarity threshold based on a determination that a distance (e.g., a Manhattan Distance, Euclidean distance, etc.) in the latent space of the two segments are less than the similarity threshold. In some embodiments, each segment may be represented by its associated centroid, set of representative values, etc. Determining the similarity between segments may include determining a distance between sets of representative values. For example, some embodiments may obtain a first face-specific data segment storing a first set of face vectors and a second face-specific data segment storing a second set of face vectors, where the values of first and second sets of face vectors are in a latent space. Some embodiments may then determine a first centroid of the first set of vectors and a second centroid of the second set of vectors, where the first and second centroid may be used as sets of representative values for each segment. Some embodiments may then determine a similarity between the first and second face-specific data segments by determining whether a distance in the latent space between the first and second centroids is within a similarity threshold.

Some embodiments may perform this determination for pairs, triplets, or some other multiple number of segments over a recurring duration. For example, some embodiments may determine whether a distance between two different segments satisfy a similarity threshold every hour, ever two hours, or four hours, every day, etc. Based on a determination that the distance between the different segments satisfy a similarity threshold, operations of the process 300 may proceed to operations described by block 324. Otherwise, operations of the process 300 may proceed to operations described by block 350.

Some embodiments may compact the pair face-specific data segments into a combined segment, as indicated by block 324. Compacting the pair of face-specific data segments into a combined segment may include modifying metadata associated with the face-specific data segments to indicate that data stored in the smaller segments are part of the larger segment. For example, some embodiments may combine an earlier segment and a later segment into a combined video segment that is indexed by a corresponding combined set of representative values. Some embodiments may then modify the starting and ending times of a combined video segment such that the starting time is the starting time of the earlier segment and the ending time is the anytime of the later segment.

Some embodiments may associate a combined set of representative values with the combined segment, as indicated by block 328. Some embodiments use an existing set of representative values of one or more of the original segments when forming the combined segment as a set of representative values for the combined segment. For example, after generating a combined segment from a first and second face-specific data segments, some embodiments may use a first representative vector of the first face-specific data segment as a representative vector for the combined segment. Alternatively, or in addition, some embodiment may generate a new set of representative values based on the combined segment. For example, some embodiments may determine a combined centroid based on a combined cluster of vectors that includes a set of face vectors of a first face-specific data segment and a set of face vectors of a second face-specific data segment and use the combined centroid of the combined cluster of vectors as a representative vector.

Some embodiments remove the representative values of the pair of segments determined to have a distance that satisfies the similarity threshold from a collection of representative vectors, as indicated by block 332. After generating or using an existing pair of segments, some embodiments may remove the individual representative vectors of the smaller segments used to generate a combined segment from a collection of representative vectors used to retrieve segments. As described elsewhere in this disclosure, searching through a set of vectors or other set of values may become significantly more time-consuming as the number of faces in an area increases and the total amount of time being stored increases. For example, some embodiments may search through a collection of representative vectors based on a candidate vector to perform a nearest-neighbor determination. By reducing the number of values to search through, some embodiments may dramatically increase the speed of matching face vectors. For example, by using operations described in this disclosure, some embodiments may reduce the number of representative vectors to be searched from 50,000 entries to 500 entries.

Some embodiments may update a local cache with the face-specific data segments and their associated set of representative values, as indicated by block 350. Some embodiments may store one or more face-specific data segments into a local node to accelerate search operations. Some embodiments may select a face-specific data segment for storage based on a time during which the video data of the segment was recorded. For example, some embodiments may store a face-specific data segment, a set of representative values associated with the segment, and a selected image of the segment in a cache based on a determination that the video segment of the face-specific data segment was recorded within a duration threshold of a current time. The duration threshold may include a duration that is greater or equal to than one hour, greater or equal to than six hours, greater or equal to than eight hours, greater or equal to one day, greater or equal to one week, or greater or equal to some other value.

Some embodiments may update a distributed database with face-related data and the associated set of representative values, as indicated by block 354. A distributed database may be a standalone distributed database service hosted across a set of geographically distributed servers. Alternatively, or in addition, the distributed database may be part of a distributed computer system. In some embodiments, the distributed computer system may include a set of computing nodes such as a set of servers or remote computing devices operated by a third party. A cloud system operating across the set of servers may perform processor operations or data storage operations similar to or the same as those described in this disclosure. For example, some embodiments may perform operations using a set of servers to determine and store face-related data on a distributed database of the distributed computer system. Face-related data may include segments of video data, face vectors of the segments, a set of representative values usable to identify the segments, face-specific metadata, etc.

Figure 4:
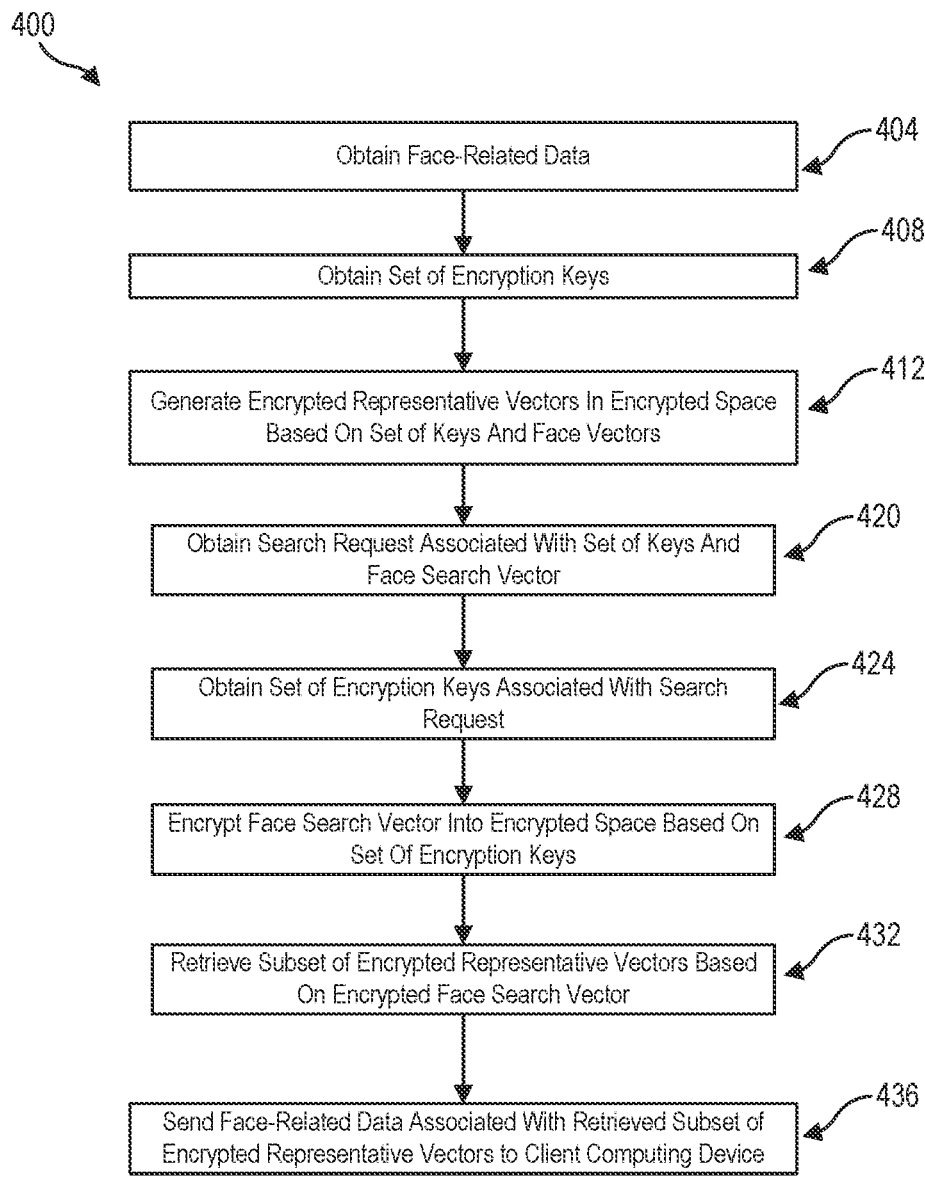
FIG. 4 shows a flowchart of a process to perform per-organization encryption of face vectors for searches, in accordance with one or more embodiments.

FIG. 4 shows a flowchart of a process to perform per-organization encryption of face vectors for searches, in accordance with one or more embodiments. Some embodiments may obtain face-related data, as indicated by block 404. Some embodiments may obtain face-related data that includes face vectors, representative values of face vectors, video segments or data segments linked to by the representative values, images containing images of faces, bounding boxes, etc. Some embodiments may obtain face-related data using operations similar to or the same as those described for block 304. Alternatively, or in addition, the face-related data may include information generated based on other face-related data using operations described in this disclosure. For example, some embodiments may generate a set of representative values for face-related data by determining a centroid vector of a plurality of face vectors in a latent space, where some embodiments may use a clustering algorithm to determine the plurality of face vectors and their associated shared region in the latent space. Some embodiments may then use the centroid vector as a set of representative values that is then used to generate encrypted representations of face-related data.

Some embodiments may obtain a set of keys, as indicated by block 408. The set of keys may be used as encryption keys or be used to generate a set of encryption keys. In some embodiments, the set of keys may include an organization-specific key that is associated with a set of login accounts or other types of user-related accounts. For example, some embodiments may store a set of organization-specific keys that may be used to encrypt face-related data, such as face vectors or representative vectors generated from the face vectors. Alternatively, or in addition, the set of keys may include locality-specific keys, where the locality-specific keys may be associated with a geographic region or an Internet protocol (IP) address. Furthermore, in some embodiments, the set of keys may represent other types of user-related information or may be obtained by transforming other types of information associated with a set of user accounts, such as a user password, a user account identifier, a private key associated with a specific user, a private key associated with the class of users, etc. Some embodiments may obtain a set of keys from a database of records, where a record of the database may include an organization-specific key, a locality-specific key, a user-specific key, etc.

Some embodiments may generate encrypted representations of face-related data based on the set of keys, as indicated by block 412. Some embodiments may generate encrypted representations that include a set of encrypted representative vectors in an encrypted space (encrypted vector set). For example, some embodiments may generate encrypted representative vectors based on a generated set of representative vectors. Alternatively, or in addition, some embodiments may generate an encrypted vector set of encrypted representative vectors by updating a set of face vectors using a homomorphic encryption method to generate a set of encrypted face vectors. Some embodiments may then determine a representative vector in the encrypted space of the encrypted vector set by performing operations on the set of encrypted face vectors. For example, some embodiments may determine a representative vector in the encrypted space by determining a centroid of the encrypted face vectors in the encrypted latent space and setting the centroid as the representative vector in the encrypted space.

Some embodiments may use a value stored in a record as a key or to otherwise determine a key. For example, some embodiments may use an organization-specific parameter stored in a record representing information about a company or other type of organization to generate a corresponding organization-specific encryption key. Some embodiments may then use the organization-specific encryption key to generate an encrypted representative vector. Using a parameter to generate a key may include using the parameter directly as the key, using the parameter as an input for a function to generate the key, or otherwise generating a key based on the parameter. For example, some embodiments may use a 16-digit number stored in association with an organization as an organization-specific key. Alternatively, some embodiments may provide the 16-digit number to a function to generate a set of keys, such as a different value to be used as an encryption key or a plurality of values to be used as encryption keys. Furthermore, some embodiments may transform an input parameter provided in a UI element to generate a key. For example, some embodiments may obtain a password from a user and transform the password into an encryption key.

In some embodiments, generating an encrypted representative vector may include performing a homomorphic encryption method on a set of input vectors. A homomorphic encryption method may preserve the relative structure of the distances and directions between representative vectors. For example, some embodiments may obtain an organization-specific key and multiply each element of each representative vector of a set of representative vectors to generate a set of encrypted representative vectors. After such a transformation, the latent space of the set of representative vectors is also describable as an encrypted latent space. After a homomorphic encryption, the nearest neighbor order and directionality between encrypted representative vectors may be the same as their decrypted representative vector counterparts. For example, after performing a homomorphic encryption, a first representative vector may be transformed into an encrypted first representative vector, and a second representative vector may be transformed into an encrypted second representative vector. If the first representative vector is closest to the second representative vector in the original latent space of the representative vector, the encrypted first representative vector is closest to the encrypted second representative vector in the encrypted latent space after the homomorphic transformation.

Some embodiments may use multiple keys when performing a homomorphic encryption operation. For example, after multiplying each element of each representative vector of a set of representative vectors by a first parameter used as an encryption key, some embodiments may then multiply each element of each representative vector of the set of representative vectors by a locality-specific vector. Thus, in order to perform an accurate search in the encrypted space using operations described in this disclosure, some embodiments may require both an organization-specific parameter and a locality-specific parameter to generate the corresponding organization-specific encryption key and locality-specific encryption key, respectively.

While the above describes encrypting vectors by multiplying elements of the vectors, some embodiments may generate an encrypted representative vector using other homomorphic encryption methods. Various algorithms may be used, such as a Gentry-Sahai-Waters (GSW) encryption, FHEW encryption, TFHEW encryption, CKKS encryption, or the like to encrypt elements in an encrypted vector space. Some embodiments may use a software implementation of a homomorphic encryption method, such as a PALISADE encryption method, Microsoft SEAL™ encryption method, etc. to encrypt a representative vector.

As should be understood, some embodiments may perform multiple types of encryption on data. Encrypted data with one set of keys using one method does not preclude encrypting the data in other methods for different purposes. For example, some embodiments may perform additional encryption operations using symmetric encryption methods after first encrypting vectors, other types of representations, or other data using a fully homomorphic encryption method. Such symmetric encryption methods may include a data encryption standard (DES) encryption method, an RC4 Cipher encryption method, an advanced encryption standard (AES) encryption method, etc. For example, some embodiments may encrypt representative vectors using a fully homomorphic encryption method, such as a lattice-based algorithm, and then further encrypt the encrypted representative vectors using an AES encryption method. Furthermore, some embodiments may encrypt the data using asymmetric encryption, such as an RSA encryption method or Diffie-Hellman encryption method.

Some embodiments may obtain a search request associated with the set of keys and a face search vector, as indicated by block 424. Obtaining a search request associated with a face search vector and the set of keys may include obtaining a set of face images from a user that is logged in at a client computing device. In some embodiments, the login account of the user may provide identifying information associating the user with the set of keys. For example, a user may be logged into an account after entering a username and password into a landing page of a website, single-page web application, native application, etc. The user may then provide an image of a face by uploading the image of the face, selecting an image of a face from a selection of faces, manipulating a pre-constructed face with a set of user interface elements, uploading the manipulated face, etc. Some embodiments may then determine a face vector from the provided face and use the face vector as a face search vector to search through face-related data for faces that match the face search vector.

Some embodiments may permit a user to view a video recording and highlight a bounding box surrounding a detected face. Alternatively, or in addition, some embodiments may permit a user to generate a bounding box and cause a client computing device or a server to detect one or more face vectors based on a detected fac in the generated bounding box. For example, a user may access a video stream and interact with a video player of the video file displayed on a web browser to open the web browser. The video player may display an overlay on top of the video stream to show bounding boxes surrounding detected people, where the bounding boxes may cover the entire detected body of a person or portions of the detected body. Alternatively, or in addition, some embodiments may permit the user to draw a box or other type of shape around an area in the image of the video stream to form a bounding box that indicates that a face is within the bounding box. Some embodiments may then perform one or more operations described in this disclosure to generate a face vector from a sub-image enclosed by the bounding box. Alternatively, some embodiments may have already generated a face vector for a selected bounding box or face surrounded by the selected bounding box. After a user selects the bounding box, some embodiments may use the same generated face vector as a face search vector.

Some embodiments may provide a set of UI elements that may be interacted with by a user to select a face without interacting with a video stream file to generate a face search vector. For example, some embodiments may provide a set of UI elements that displays a set of faces in response to a text query entered into a search box. Alternatively, or in addition, some embodiments may provide a user with a selection box to select one or more categories from a set of categories. After the selection of a category, some embodiments may use the selection as a filter to search for faces associated with those categories. For example, some embodiments may provide a set of tags that a user may select, where the tanks may include terms such as "employee," "visitor," "unauthorized person," "supervisor," etc. The selection of the tags or an interaction with a button to initiate a search may cause a searching program to search through a set of records or other data for stored faces or their associated face vectors.

Some embodiments may obtain a set of keys associated with the search request, as indicated by block 424. A user may be logged into a user record of a set of user records. The user record may include user-related values such as access privileges that permit a user to access values or records associated with the user record (e.g., a login account, a security profile, an organization-specific account, etc.). Some embodiments may receive a search request that is associated with the user record. For example, some embodiments may receive a search request from a user logged into their user record on a client computing device, where the search request may include or otherwise be linked to an encryption key sent from the client computing device. Furthermore, some embodiments may determine that a search request is not associated with a pre-determined organization-specific parameter and, in response, reject the search request.

Some embodiments may encrypt the face search vector into the encrypted space based on the set of keys, as indicated by block 428. Some embodiments may encrypt the face search vector using the set of keys obtained using operations described by block 408. For example, some embodiments may obtain a face search vector and determine an organization associated with the search request based on a user record identified in the search request linked to the organization or other data identified in the search request. Some embodiments may then retrieve a set of keys associated with the organization, such as by retrieving a record identified by an organization identifier associated with the organization and then accessing the record to retrieve an organization-specific encryption key. Some embodiments may then encrypt the face vector in the encrypted space using the encryption key.

In some embodiments, the face search vector sent to a server may have been already transformed into an encrypted face search vector by client computing device. For example, after a user selects a face and clicks on a UI element that reads "search," some embodiments may encrypt a face search vector with a processor or other computing resource of a client computing device to determine an encrypted face search vector. Some embodiments may thus proceed directly to operations described by block 432 to retrieve a subset of the encrypted representative vectors based on the encrypted face search vector.

Alternatively, some embodiments may receive a face search vector that was not encrypted with the set of keys obtained using the operations described by block 408. As should be understood, receiving a face search vector that was not encrypted by the set of keys obtained using the operations described by block 408 may include receiving a face search vector encrypted using a different key. For example, some embodiments may generate a face vector and then encrypt the face vector when transmitting the data to a server using RSA encryption or another encryption method. After receiving a face search vector, some embodiments may then encrypt the face search vector with the set of keys obtained using the operations described by block 408. For example, after receiving an RSA-encrypted face search vector at a server, some embodiments may perform operations to decrypt the face search vector using a secret key stored on the server to obtain a face search vector that has been decrypted with respect to the RSA encryption but remains encrypted with respect to the set of keys described by block 408.

Some embodiments may retrieve a subset of the encrypted representative vectors based on the encrypted face search vector, as indicated by block 432. As described elsewhere in this disclosure, the encrypted face search vector is encrypted into an encrypted space that may be homomorphic with respect to the original latent space of face vectors. By encrypting into a homomorphic space, relative distances between encrypted vectors may accurately reflect relative distances between their unencrypted counterparts. For example, some embodiments may search through an encrypted vector set determine that a first encrypted face vector of the encrypted vector set is a nearest neighbor of an encrypted face search vector. If the first encrypted face vector was decrypted into the original latent space of face vectors and the encrypted face search vector was first decrypted into the original latent space of face vectors, the decrypted version of the first encrypted face vector would also be the nearest neighbor of the decrypted face search vector. Thus, some embodiments may select a nearest neighbor of a face search vector in an encrypted space without decrypting the face search vector.

When searching based on a query, some embodiments may determine or otherwise obtain a search radius threshold. Some embodiments may limit a search result or the latent space of a search based on the search radius threshold. Some embodiments may determine an encrypted search radius threshold based on an encryption key by transforming a pre-set search parameter into a search radius of an encrypted latent space by applying a fully homomorphic transformation on the pre-set search parameter. Some embodiments may then determine whether a distance in the encrypted latent space between a candidate encrypted vector and an encrypted face search vector satisfies the encrypted search radius threshold. Some embodiments may determine that the distance satisfies the encrypted search radius threshold and, in response, select the candidate encrypted vector as a search result of the query.

By performing searches in an encrypted space instead of in the original latent space of a face search vector, some embodiments may protect face-related data from unauthorized searches. These protections may extend even under the possibility that an organization obtains unauthorized access to another organization's face search information. Because the face vectors available to an organization are stored in an encrypted space, such information may be meaningless to any entity that does not have the set of keys used to transform the original face vectors into their corresponding encrypted face vector versions. Such a configuration would thus frustrate attempts to reverse-engineer face vectors into their original faces.

Some embodiments may apply additional homomorphic transformations on encrypted search vectors to generate converted encrypted search vectors that retain their homomorphic properties with respect to another encrypted latent space. For example, some embodiments may receive instructions to search through two different organizations based on a converted encrypted face search vector, where records of each organization may be allowed store their own organization-specific parameter and may also store a set of conversion parameters usable to permit the conversion of a face search vector in one encrypted latent space to another encrypted latent space. For example, some embodiments may receive a face search vector from an inputted face. Some embodiments may then convert the face search vector into an encrypted face search vector for a first latent space of a first vector set. Some embodiments may then convert the face search vector into a converted encrypted face search vector that may be used to search a second latent space by applying a second homomorphic transformation on the converted face search vector. The second homomorphic transformation may be performed with a conversion parameter that is generated based on the first encryption key and a second encryption key. By storing conversion parameters instead of organization-specific keys directly, some embodiments may further secure the privacy of face data for each organization.

Some embodiments may send face-related data linked to or otherwise associated with the retrieved subset of encrypted representative vectors to the client computing device, as indicated by block 436. As described elsewhere in this disclosure, a representative vector may be associated with other face-related data, such as an image of a face, a user profile, identifying information associated with the person having the face, etc. For example, after retrieving a subset of three encrypted representative vectors selected from a library of face vectors, some embodiments may retrieve three separate sets of face-related data that are each linked to their corresponding encrypted representative vectors in the library of face vectors. Some embodiments may then display images of three different faces associated with the subset of three encrypted representative vectors and a name or identifier associated with each face. Alternatively, or in addition, some embodiments may provide other information, such as an indicated set of times during which a person identified by the subset of encrypted representative vectors had entered or departed from a geographic location. Furthermore, some embodiments may determine that a set of user-related values of a user record used to perform a search comprises a set of access privileges. Some embodiments may filter a set of search results based on the set of access privileges to reduce the search results to a filtered set of face-related data and send the filtered set of face-related data to a client computing device.

The operations of each method presented in this disclosure are intended to be illustrative and non-limiting. It is contemplated that the operations or descriptions of FIGS. 3-4 may be used with any other embodiment of this disclosure. In addition, the operations and descriptions described in relation to FIGS. 3-4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to program instructions stored electronically on a non-transitory, machine-readable medium, such as an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1 and 2 could be used to perform one or more of the operations in FIGS. 3-4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 5:
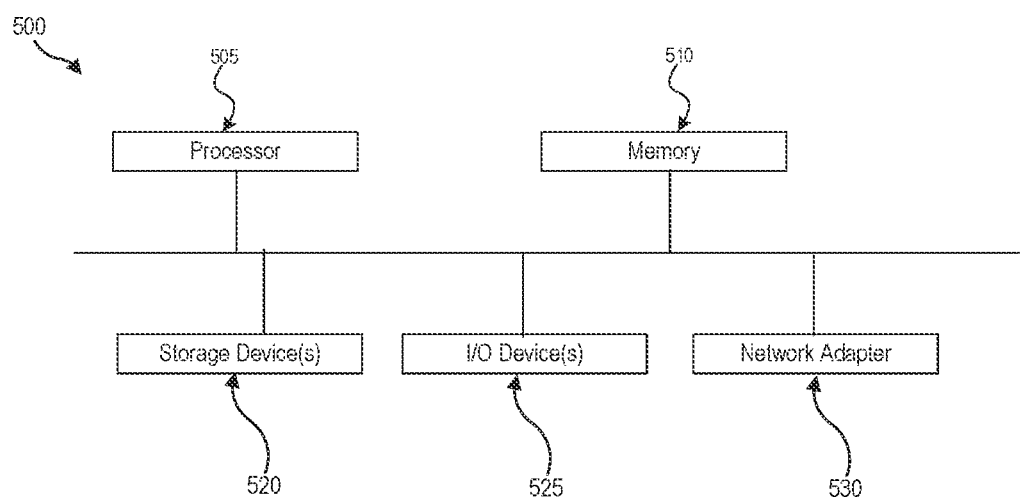
FIG. 5 is a block diagram of a computer system as may be used to implement certain features of some of the embodiments.

FIG. 5 is a block diagram of a computer system as may be used to implement certain features of some of the embodiments. The computer system 500 may include a set of central processing units ("set of processors") 505, memory 510, input/output devices 525, e.g., keyboard and pointing devices, touch devices, display devices, storage devices 520, e.g., disk drives, and network adapters 530, e.g., network interfaces, that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called FireWire.

The memory 510 and storage devices 520 are computer-readable storage media that may store program instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The program instructions stored in memory 510 can be implemented as software and/or firmware to program the set of processors 505 to carry out actions described above. In some embodiments, such software or firmware may be initially provided to the computer system 500 by downloading it from a remote system through the computer system 500, e.g., via network adapter 530.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompass both all such attributes or functions being mapped to all such objects and subsets of the attributes or functions being mapped to subsets of the objects (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y"), in contrast to statements that might be improperly argued to imply sequence limitations (e.g., "performing X on items, performing Y on the X'ed items") used for purposes of making claims more readable rather than specifying sequence. Statements referring to "at least Z of A, B, and C" and the like (e.g., "at least Z of A, B, or C") refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

What is claimed is:

1. A method for securely retrieving face-related data by using an organization-specific encryption key, the method comprising:
obtaining an encrypted search vector, wherein:
the encrypted search vector is determined based on an image of a face and an organization-specific encryption key, and
the organization-specific encryption key is associated with an organization identifier based on a parameter associated with the organization identifier stored in a record;
obtaining a first encrypted vector by searching a first encrypted vector set stored in a first database based on the encrypted search vector, wherein:
for each respective encrypted vector of the first encrypted vector set, the respective encrypted vector is generated by encrypting a respective vector using the organization-specific encryption key,
a second encrypted vector set is stored in a second database,
a second encrypted vector of the second encrypted vector set is encrypted without using the organization-specific encryption key, and
obtaining the first encrypted vector comprises selecting the first database for a search operation; and
decrypting the first encrypted vector to obtain an identifier associated with a face image used to generate the first encrypted vector.

2. The method of claim 1, further comprising:
determining a plurality of vectors based on a plurality of face images;
determining a centroid vector based on the plurality of vectors; and
determining the first encrypted vector based on the centroid vector using the organization-specific encryption key.

3. The method of claim 1, further comprising:
determining a first vector based on the face image;
encrypting the first vector based on the organization-specific encryption key to generate the first encrypted vector; and
associating the first encrypted vector with the identifier in a database.

4. The method of claim 1, wherein searching the first encrypted vector set comprises selecting the first encrypted vector based on a distance between the encrypted search vector and the first encrypted vector in a latent space of the first encrypted vector set.

5. The method of claim 1, further comprising:
obtaining a request comprising the organization identifier; and
searching a set of keys based on the organization identifier to retrieve the organization-specific encryption key.

6. The method of claim 5, wherein obtaining the encrypted search vector comprises obtaining the request, wherein the request comprises the encrypted search vector.

7. A set of non-transitory, machine-readable media storing instructions that, when executed by a set of processors, causes the set of processors to perform operations comprising:
obtaining an encrypted search vector, wherein:
the encrypted search vector is determined based on a first image and a target encryption key, and
the target encryption key is associated with an organization identifier based on a parameter associated with the organization identifier stored in a record;
obtaining a first encrypted vector by searching an-a first encrypted vector set stored in a first database based on the encrypted search vector, wherein:
for each respective encrypted vector of the first encrypted vector set, the respective encrypted vector is generated by encrypting a respective vector using the target encryption key,
a second encrypted vector set is stored in a second database,
a second encrypted vector of the second encrypted vector set is encrypted without using the target encryption key, and
obtaining the first encrypted vector comprises selecting the first database for a search operation; and
decrypting the first encrypted vector to obtain an identifier associated with a second image used to generate the first encrypted vector.

8. The set of non-transitory media of claim 7, wherein searching the first encrypted vector set comprises performing a nearest neighbor search through the first encrypted vector set based on the encrypted search vector.

9. The set of non-transitory media of claim 7, wherein obtaining the first encrypted vector comprises:
   obtaining a set of values indicating an access privilege;
   obtaining initial results associated with an initial subset of vectors based on the searching of the first encrypted vector set; and
   filtering the initial results based on the set of values to determine filtered results, wherein the filtered results comprise data associated with the first encrypted vector.

10. The set of non-transitory media of claim 7, the operations further comprising:
    obtaining video data comprising the first image;
    extracting a set of face vectors based on the video data; and
    determining the encrypted search vector based on a selected vector of the set of face vectors.

11. The set of non-transitory media of claim 7, the operations further comprising obtaining:
    a locality-specific parameter associated with a geographic location; and
    determining the target encryption key based on the locality-specific parameter.

12. The set of non-transitory media of claim 7, the operations further comprising:
    determining a face vector based on the second image; and
    encrypting the face vector using a homomorphic transformation based on a second encryption key to generate the second encrypted vector, wherein the second encryption key is associated with a second organization identifier.

13. The set of non-transitory media of claim 7, wherein searching the first encrypted vector set comprises selecting the first encrypted vector based on a distance between the encrypted search vector and the first encrypted vector in a latent space of the first encrypted vector set.

14. A system comprising:
    one or more processors; and
    memory storing program instructions that, when executed by the one or more processors, cause the one or more processors to effectuate operations comprising:
      obtaining an encrypted search vector, wherein:
        the encrypted search vector is determined based on an image and a encryption key, and
        the encryption key is associated with an organization identifier based on a parameter associated with the organization identifier stored in a record;
      obtaining a first encrypted vector by searching a first encrypted vector set stored in a first database based on the encrypted search vector, wherein:
        for each respective encrypted vector of the first encrypted vector set, the respective encrypted vector is generated by encrypting a respective vector using the encryption key,
        a second encrypted vector set is stored in a second database,
        a second encrypted vector of the second encrypted vector set is encrypted without using the encryption key, and
      obtaining the first encrypted vector comprises selecting the first database for a search operation; and
      decrypting the first encrypted vector to obtain an identifier associated with data used to generate the first encrypted vector.

15. The system of claim 14, wherein searching the first encrypted vector set based on the encrypted search vector comprises searching a latent space of the first encrypted vector set based on a set of distances between vectors of the first encrypted vector set and the encrypted search vector.

16. The system of claim 14, wherein the encrypted search vector is determined using a homomorphic transformation.

17. The system of claim 14, wherein the identifier is associated with a set of images, the operations further comprising:
    obtaining a bounding box outlining a face of the set of images; and
    providing the set of images and the bounding box to a client computing device.

18. The system of claim 14, the operations further comprising:
    obtaining a video stream; and
    determining the encrypted search vector based on an image of the video stream, wherein determining the encrypted search vector occurs in real-time with respect to the video stream.

19. The system of claim 14, wherein the encrypted search vector is a first encrypted search vector, and wherein the encryption key is a first encryption key, and wherein the organization identifier is a first organization identifier, and the identifier is a first identifier, and the operations further comprising:
    obtaining a second encrypted search vector, wherein:
      the second encrypted search vector is determined based on the image and a second encryption key, and
      the second encryption key is associated with a second organization identifier;
    obtaining the second encrypted vector by searching the second encrypted vector set with the second encrypted search vector, wherein, for each respective encrypted vector of the second encrypted vector set, the respective encrypted vector is generated by encrypting a respective vector using the second encryption key; and
    decrypting the second encrypted vector to obtain a second identifier associated with data used to generate the second encrypted vector.

20. The system of claim 14, wherein the first encrypted vector set is stored in a separate database from the data used to generate the first encrypted vector.

* * * * *